INVENTOR.
William J. Goodfriend
ATTORNEYS

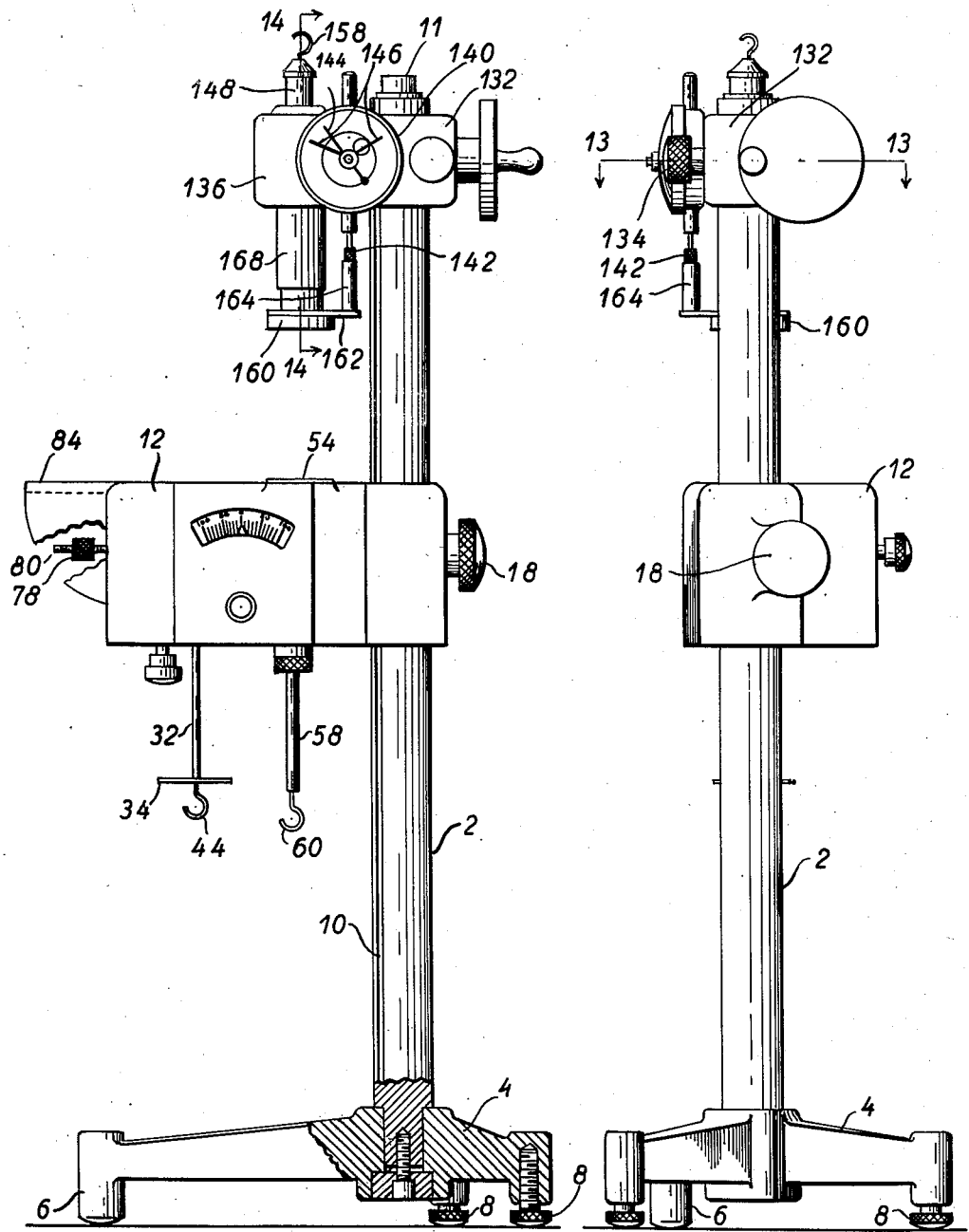

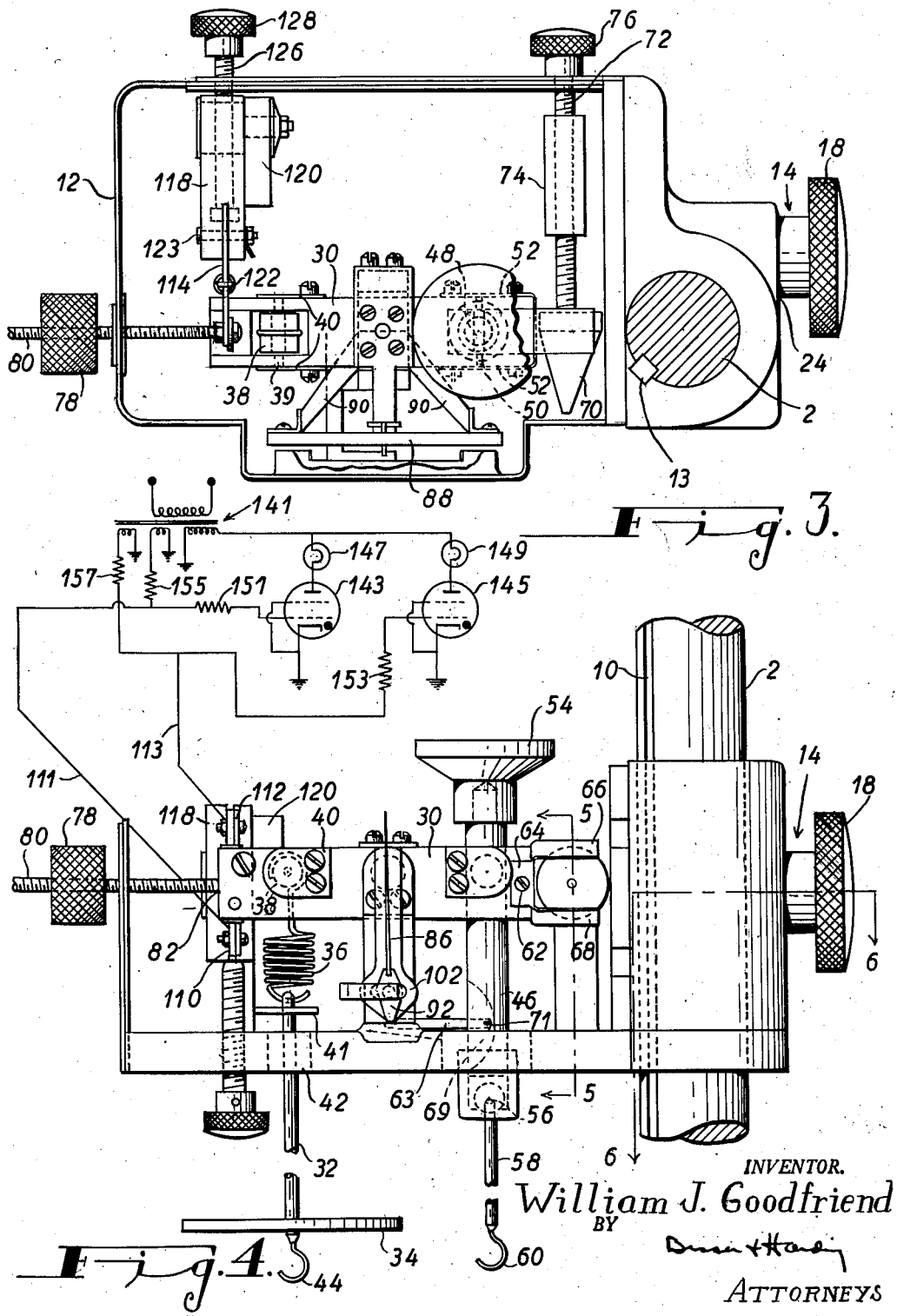

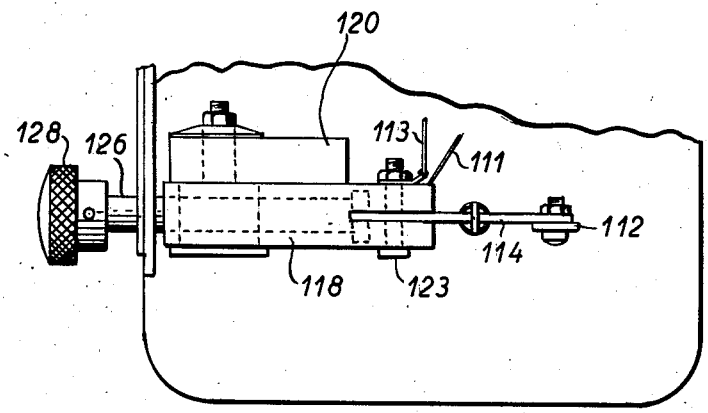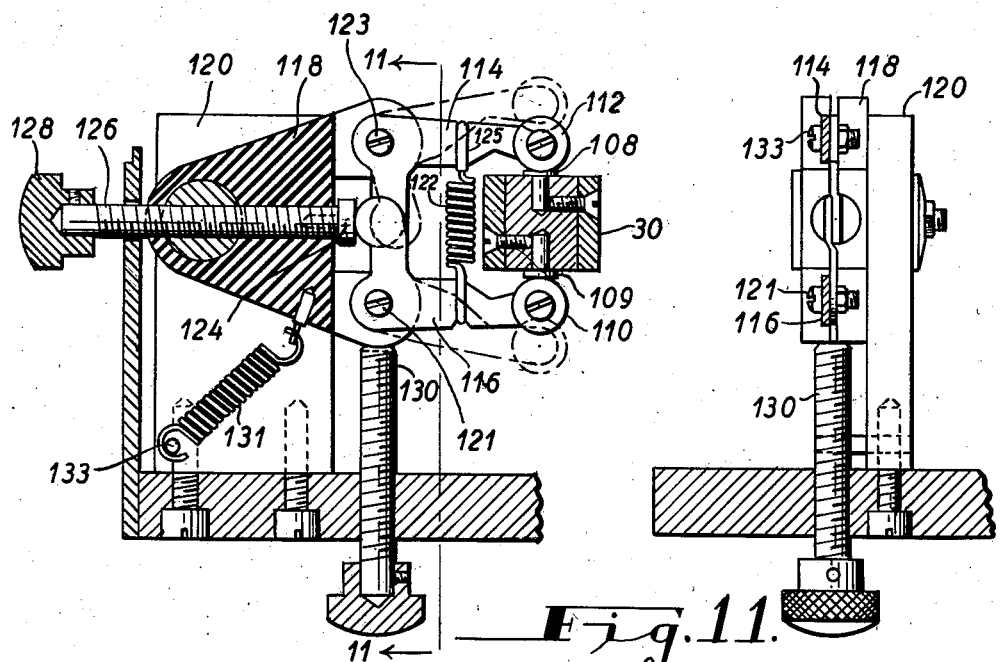

INVENTOR
William J. Goodfriend
BY
ATTORNEYS

Patented Sept. 30, 1952

2,612,041

UNITED STATES PATENT OFFICE 2,612,041

COMBINED TENSION-COMPRESSION TESTING APPARATUS

William J. Goodfriend, Worcester, Pa., assignor to Hunter Spring Company, Lansdale, Pa., a corporation of Pennsylvania Application June 2, 1947, Serial No. 751,697

4 Claims. (Cl. 73—93)

This invention relates to a force measuring device. More particularly, it is directed to a beam scale device adapted to the measurement of a force exerted by the extension or compression of an elastic element such as, for example, a coil spring.

An object of this invention is to provide a testing device embodying novel means for displacing a spring a predetermined amount and means for measuring the force required to produce the displacement.

Another object of this invention is to provide rapid means for indicating whether or not the force exerted by a spring displaced a given amount is within the desired limits of accuracy.

Another object of this invention is to provide rapid means for indicating whether or not the amount a spring must be displaced to exert a given force is within the desired limits of accuracy.

Another object of this invention is to provide a spring testing device which may be used interchangeably to test a spring either under conditions of compression or extension.

A further object of this invention is to provide a beam scale testing device which permits rapid testing due to the provision of means to protect the beam from excessive load shocks.

This and other objects of this invention will become apparent from the following description read in conjunction with the accompanying drawings in which:

Fig. 1 is a front elevation of the force measuring device showing part of the base in section;

Fig. 2 is a side elevation of the device of Fig. 1;

Fig. 3 is a plan view of the beam scale with the casing removed;

Fig. 4 is a front elevation of the beam scale with the casing removed and showing an electronic indicator circuit;

Fig. 10 is a top view of contacts for an electronic indicator;

Fig. 11 is a front view of the device of Fig. 10;

Fig. 12 is a side view of the device of Fig. 10;

Figure 5:
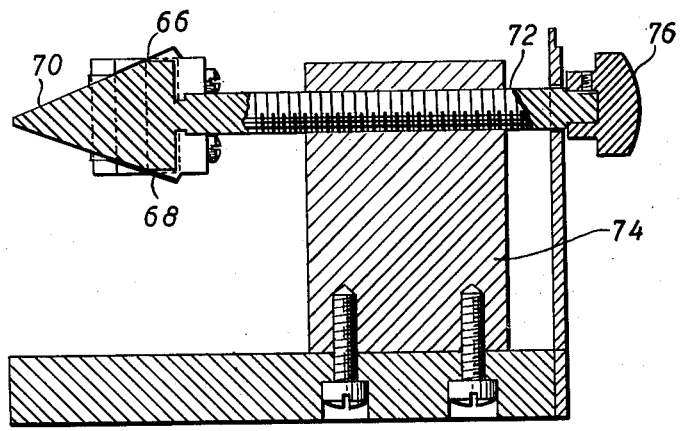
Fig. 5 is a section through the line 5—5 of Fig. 4.

The embodiment of the invention illustrated has a standard 2 removably secured to a base 4, which has a fixed leg 6 and two adjustable legs 8. The standard 2 is circular with a keyway 10 extending vertically from the point of intersection with the base to the top of the standard. A circular spirit level 11 is secured to the top of the standard 2.

Figure 6:
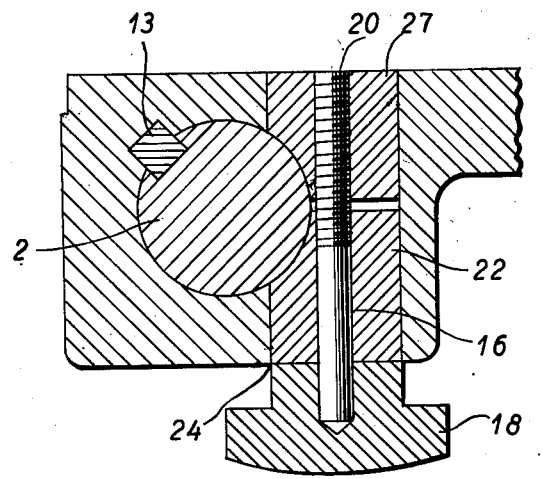
Fig. 6 is a section through the line 6—6 of Fig. 4.

Slidably mounted on the standard 2 is a scale casing 12 having a key 13 and secured to the standard by the clamping bolt shown generally at 14 in Fig. 6, which comprises a screw 16 having a head 18, a threaded stem 20, a member 22, which freely rotates on stem 20 and conforms in shape to the standard and the opening 24 in the casing 12. The clamp member 27 is similar to member 22, but has female threads conforming to the threads of stem 20.

Figure 7:
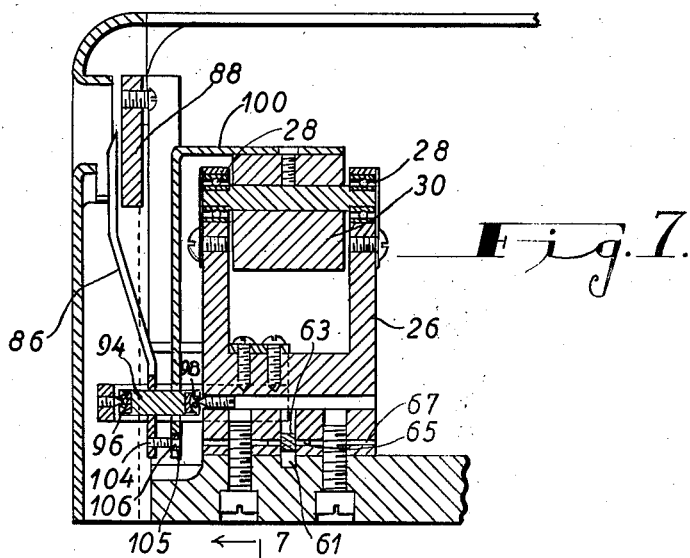
Fig. 7 is a section through the line 7—7 of Fig. 8.
Figure 8:
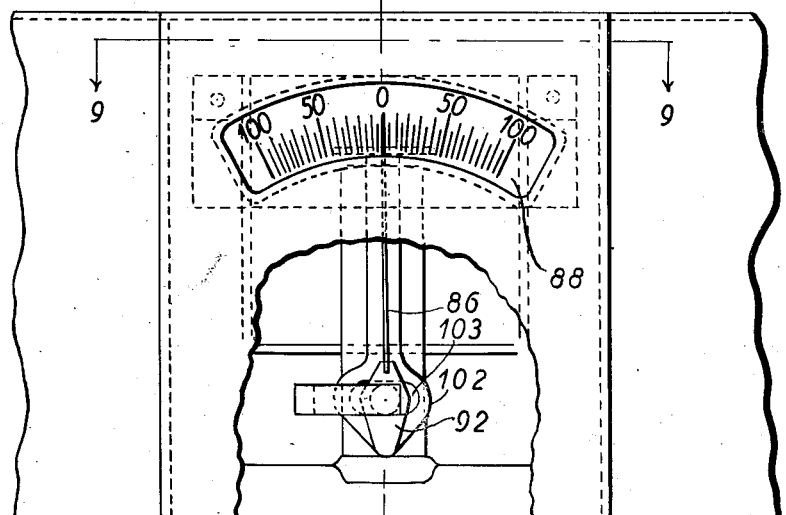
Fig. 8 is a front view of the beam pointer and scale with the casing partially broken away.
Figure 9:
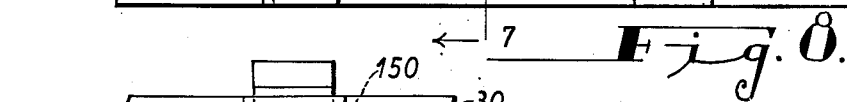
Fig. 9 is a section through the line 9—9 of Fig. 8.
Figure 13:
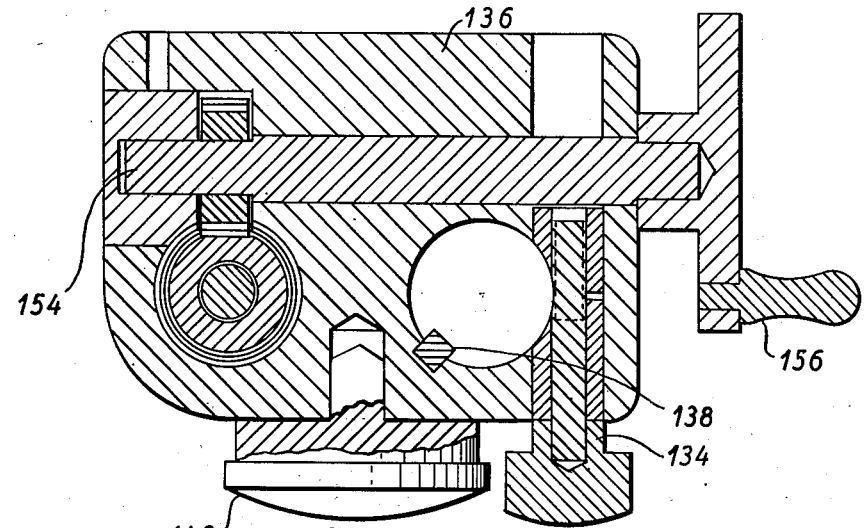
Fig. 13 is a section through the line 13—13 of Fig. 2.
Figure 14:
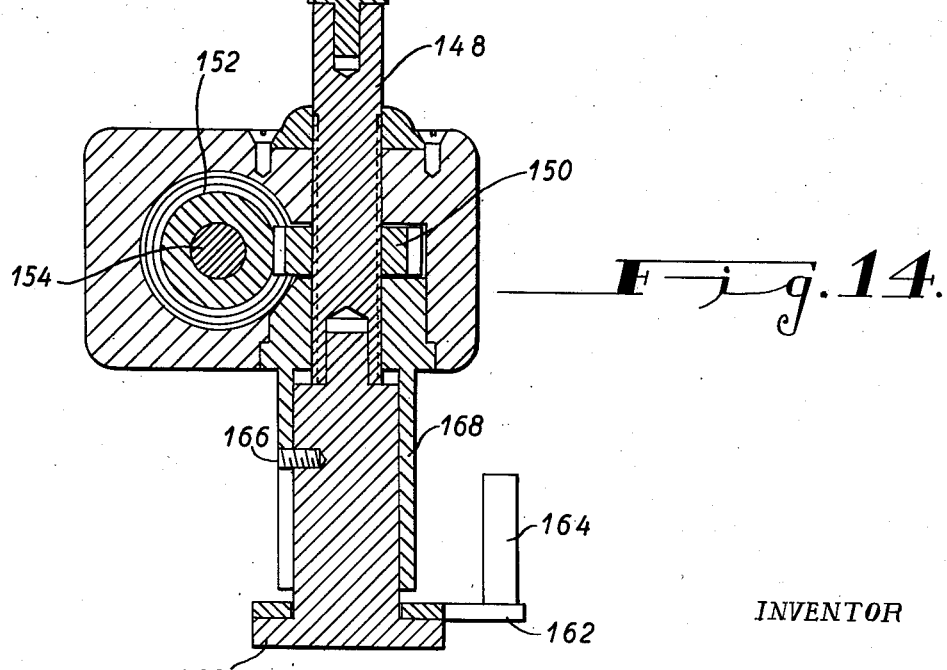
Fig. 14 is a section through the line 14—14 of Fig. 1.

As shown in Fig. 7, secured to the bottom of the scale casing 12 is a U-shaped beam supporting bracket 26 which, by means of roller bearings 28, supports the scale beam 30.

A rod 32, supporting weight pan 34, is secured to the coil spring 36. The coil spring has a hook-shaped end which engages a collar 38 mounted in an opening in the beam scale and which is free to rotate on rod 39. The plates 40 retain ball bearings which carry the rod 39. The disc 41 is fixedly secured to the rod 32 and has a radius greater than that of the aperture 42 in the bottom of the scale casing through which the rod 32 passes. The rod 32 projects below the pan 34 and has a hook 44 at its lower extremity.

The load rod 46 is pivoted on the beam 30 by means of the rod 50 carried by the ball bearing 48. The rod 50 is supported by ball bearings retained by the plates 52. A load platform 54 is threaded to the upper end of the rod 46. Pivotally secured to the lower end of rod 46 at 56 is a rod 58 having a load hook 60 at its lower extremity.

A slot 61 formed in supporting bracket 26 and scale casing 12 is adapted to receive link 63 which, by a ball bearing, is pivotally mounted on a pin 65 which is retained in aperture 67. Pin 65 lies directly below the pivot point of beam 30 as shown clearly in Figure 7. As shown in Fig. 4, a slot 69 in rod 46 is adapted to receive link 63, which is pivotally secured to rod 46 by a pin 71 which is directly below rod 50. The bottom of casing 12 is cut out so as to permit freedom of movement of the link 63 which it will be apparent operates to maintain rod 46 vertical irrespective of the position of the beam 30.

Secured to the beam 30 at 62 is the step bracket 64 which has sides 66 and 68 which are pitched at an angle to the horizontal equal to the cone angle of the conically shaped stop 70. The stop 70 is mounted on the end of the screw 72 which is threaded through the bracket 74, which is in turn secured to the bottom of the beam casing. The screw 72 passes through the back of the beam casing and at its outer extremity has a knob 76. The stop 70 is mounted to be moved horizontally so that when it is simultaneously in contact with both stop bracket sides 66 and 68, it will lock the beam 30 in a horizontal position.

Exterior of the scale casing a counterbalance 78 is threaded to stud 80, secured to the beam 30 at 82. The scale casing is provided with a free passage for the stud 80 irrespective of the position of the beam 30. A shield 84 is secured to the scale casing to protect the counterbalance 78 and the stud 80 from being inadvertently touched.

A pointer 86 moves over a scale 88 marked with an arbitrary scale. The scale 88 is supported by the legs 90 and is viewed through an opening in the front of the scale casing.

The pointer 86 is fixedly secured to the support 92, which is fixedly secured to the shaft 94. The shaft 94 is mounted in jewel or ball bearings at 96 and 98.

The pointer is actuated by the L-shaped arm 100, which is fixedly secured to the top of the beam 30 directly above the pivot point. The bracket 100 has an enlarged heart-shaped portion 102 in which is a slot 103 through which the shaft 94 can pass without touching the bracket 100 at any time. The pin 104 is fixedly secured at one end to the lower portion of the pointer support 92 and at the opposite end has a radial ball bearing assembly 105 which coacts with a slot 106 in the lower portion of the bracket 100.

Removably secured on the top and bottom of the beam 30, respectively, are contacts 108 and 109. Contacts 110 and 112 are fixedly secured to bell cranks 116 and 114, respectively. Bell cranks 116 and 114 are pivotally held in a slot in bracket 118 by bolts 121 and 123 as shown in Figures 10 and 12. Leads 111 and 113 are connected to the bolts 121 and 123, respectively. Bracket 118 is constructed of an insulating material such as, for example, "Bakelite" and is pivotally mounted on a stand 120.

Coil spring 122 has its opposite ends secured to notches in the bell cranks 114 and 116 and is insulated from bell crank 114 by rubber covering 125. Spring 122 tends to force contacts 110 and 112 closer together and in so doing forces the overlapping portions of the bell cranks against the non-conducting stop 124, which is attached to a screw 126 having a knob 128.

The coil spring 131 is fixedly secured at one end to the bracket 118 and at the other end of a pin 133 secured in stand 120 and acts to keep bracket 118 in contact with stop 130 which is threaded in the casing 12.

The leads 111 and 113 heretofore referred to are connected to an electronic relay arrangement which may be of any conventional type, for example, involving gas tubes as indicated in the wiring diagram in Figure 4. A transformer 141, the primary of which is connected to the commercial alternating supply means, is provided with a plurality of secondaries including a high voltage secondary grounded at one end and at its other end connected to the anodes of a pair of gas tubes 143 and 145 in series with signal lamps 147 and 149. The cathodes of these tubes are grounded. The lines 111 and 113 are, respectively, connected to the grids of the gas tubes through protective resistances 151 and 153. They are also connected through resistances 155 and 157 to the ungrounded sides of a pair of secondaries adapted to provide grid bias. Contacts 108 and 109 are grounded through the beam 30. The transformer 141 may include an additional secondary (not illustrated) supplying the heaters of the tubes.

The tubes 143 and 145 may be of the 2050 type which are maintained in non-firing condition by negative potentials applied to their control grids but which fire, with a proper positive potential on their anodes, when the control grids are at cathode potential. The transformer secondary connections are made in such fashion that, when the beam does not ground either of the lines 111 or 113, the anodes of the tubes are positive when the cathodes are driven negative by the several transformer secondaries. The tubes will, of course, not fire when the anodes are negative even though the control grids are then positive. Assuming that the beam grounds the line 111, it will be evident that the grid of the tube 143 will then be at ground potential so that the tube will fire on each half cycle when its anode is positive. The rapid succession of current pulses will then light the signal lamp 147. Similarly, if the beam grounds the line 113, the signal lamp 149 will be lighted.

A displacement device shown generally at 132 is removably secured to the standard 2 by the clamping bolt 134, which is similar to bolt 14 described in detail above. Inset in the block 136 is the key 138, which fits into the keyway 10 of the standard 2.

Secured to the front of the block 136 is a dial indicator 140, which may be of the rack and gear type having a contact point 142. It is preferred to use a dial indicator of the movable face zero setting type. Moving over the face of the dial indicator 140 are the pointer 144 and the tolerance hands 146.

A movable vertical force rod 148 is mounted in the block 136. Threaded to the rod 148 is spiral gear 150, which in turn engages spiral gear 152. The gear 152 is secured to the shaft 154, which has a crank handle 156. Secured to the top of the column is a hook 158 and to the bottom of the column a pressure member 160. The column 148 is connected to the contact point 142 through the plate 162 and the vertical rod 164, which is mounted thereon. A horizontal pin 166 is secured to pressure member 160 and rides in a vertical slot in collar 168 preventing the rod 148 and fittings from rotating.

As specifically illustrative of the operation and usefulness of this embodiment of the invention, consider the problem of testing a compression coil spring to see if, for a given displacement, it exerts a force which is within the required tolerances.

In order to test a compression spring, we place the displacement device 132 on the standard 2 above the scale casing 12, as shown in Fig. 1.

With the stop 70 holding the beam in the locked or horizontal position, the stop 124 is turned until either contact 110 or 112 touches its respective contact on the beam. Stop 130 is then rotated to cause the contact to be broken. The stops 124 and 130 are thus moved until the signal lamps 147 and 149 indicate that both contacts 110 and 112 are just touching their respective contacts 109 and 108. This method of centering the contacts 110 and 112, with respect to the beam contacts, provides for accuracy irrespective of any wear of the contacts.

In order now to set the contacts 110 and 112 to the high and low limit positions in which it is desired to have them, the stop 124 is rotated clockwise thus forcing the contacts to move equally away from the beam contacts. The beam stop 70 is turned counterclockwise sufficiently to permit the beam to have the desired freedom of movement. The beam is moved by hand until the pointer 86 indicates the high limit on scale 88. By the stop 124, the contact 112 is adjusted until it just makes contact with contact 108 as indicated by lamp 149. This procedure simultaneously sets the contact 110 in the proper low limit position. It is apparent that this procedure could be reversed by starting out with the pointer 86 set on the low limit position.

It will be noted that the limits can be checked directly from the pointer 86 on the scale 88. However, much greater speed and accuracy can be obtained in testing by the use of signal lamps controlled by an electronic relay.

In order to counterbalance the weight of the spring to be tested, an identical spring is attached to the hook 44. The beam is again locked in the horizontal position by stop 70. A weight, or weights, equal to the specification force of the spring for the given displacement are now placed on the weight pan 34.

The compression coil spring is now placed on the load platform 54 and the displacement device 132 is lowered with the column 148 in the raised position until the pressure member 160 touches the spring and is then secured to the standard. The dial indicator 140 is set to zero and the column 148 lowered until the spring has been displaced the desired amount as indicated by the dial indicator. The stop 70 is now moved out to release the beam 30.

If the spring exerts the correct force for the displacement, the pointer 86 will be at zero on the scale 88 and obviously neither the contact 108 nor 109 will be in contact with its corresponding contact. If the force exerted for this displacement falls above or below the limits, the beam contacts will touch either contact 110 or 112 causing the corresponding signal lamp to indicate. The pointer 86 will likewise indicate whether or not the limits are exceeded.

It will be noted that once the original set-up has been made for a certain design of spring having set limits, it is only necessary normally to pull the first spring out and compress the next spring by hand and insert it between the pressure member 160 and the platform 54 without making any further adjustments.

The spring 36 prevents a sudden shock from being transmitted to the beam incident to rough handling of the weight and the disc 41 acts as a stop for the rod 32 by abutting against the bottom of the casing if the rod 32 is pulled down an excessive amount. This prevents heavy shocks to the scale beam due to the stop bracket 64 being brought into forceful contact with the stop 70 incident to the rod 32 inadvertently being rapidly pulled down by weights, or other means.

If it is desired to measure the displacement of a compression spring when subjected to a specified force, the procedure is the same as that outlined above except the rod 148 would be adjusted until the force exerted by the spring balanced the force exerted by the weight on weight pan 34 and the pointer 86 was on zero. Then the dial indicator will indicate the displacement. The tolerance hands 146 may be set at the desired upper and lower limits of displacement to assist in a rapid determination of whether or not the spring's displacement falls within the limits.

In order to use this embodiment of the invention to test tension springs, the displacement device 132 and the scale casing 12 must be removed from the standard 2 and reversed with the displacement device placed below the beam scale casing. The coil spring is then supported on the hook 60 and secured to the hook 158 on the rod 148. In all other respects the procedure for testing an extension spring is identical with the procedure used to test a compression spring.

It should be noted that the invention is not limited to the specific embodiment illustrated and described above, it being apparent that numerous modifications in detail may be made without departing from this invention.

What I claim and desire to protect by Letters Patent is:

1. A force measuring device adapted for testing springs comprising a standard, a support member, said support member being adjustably secured to the standard selectively at various heights, a scale beam having means thereon to indicate the position of said beam, pivotally secured to said support member, a vertical bar pivotally secured to one end of said beam and having means thereon for engaging a spring, means secured to the other end of said beam to counter-balance the force exerted on the scale beam through said vertical bar, a second support member adjustably and removably secured to said standard at various positions thereon, a vertical force rod secured to said second support member and co-axial with said vertical bar, said force rod having means thereon for engaging a spring, means on said second support member to move the force rod relative to said second support member, and means in operative engagement with said force rod to measure the displacement thereof.

2. A force measuring device adapted for testing springs comprising a standard, a support member, said support member being adjustably secured to the standard selectively at various heights, a scale beam having means thereon to indicate the position of said beam, pivotally secured to said support member, a vertical bar pivotally secured to one end of said beam and having means thereon for engaging a spring, means secured to the other end of said beam to counter-balance the force exerted on the scale beam through said vertical bar, a beam locking device adjustably secured to said support member and adapted to selectively engage said beam, a second support member adjustably and removably secured to said standard at various positions thereon, a vertical force rod secured to said second support member and co-axial with said vertical bar, said force rod having means thereon for engaging a spring, means on said second support member to move the force rod relative to said second support member, and means in operative engagement with said force rod to measure the displacment thereof.

3. A force measuring device adapted for testing springs comprising a standard, a support member, said support member being adjustably secured to the standard at various heights, a scale beam pivotally secured to the support member, a vertical bar pivotally secured to one end of said beam and having means thereon for engaging a spring, means secured to the other end of said beam to counter-balance the force exerted on the scale beam through said vertical bar, a pair of electrical contacts on opposite sides of said beam, a second pair of contacts apart from said beam adjacent said first pair of contacts, each of said second contacts adapted to abut one of said first pair of contacts when the beam is in an unbalanced position, an electrical circuit in operative association with said second contacts to indicate beam unbalance, a second support member adjustably and removably secured to said standard at various positions thereon, a vertical force rod secured to said second support member and co-axial with said vertical bar, said force rod having means thereon for engaging a spring, means on said second support member to move the force rod relative to said second support member, and means in operative engagement with said force rod to measure the displacement thereof.

4. A force measuring device adapted for testing springs comprising a standard, a support member, said support member being adjustably secured to the standard at various heights, a scale beam pivotally secured to the support member, a vertical bar pivotally secured to one end of said beam and having means thereon for engaging a spring, means secured to the other end of said beam to counterbalance the force exerted on the scale beam through said vertical bar, means to indicate the position of the beam comprising electrical contacts on the top and bottom of the beam, a pair of bell cranks secured to said support member and having their respective pivot points lying in the same vertical plane, a pair of respective ends of the bell cranks overlapping and the other pair of ends of the bell cranks respectively carrying contacts in opposition to the beam contacts, adjustable means abutting against the overlapping ends of the bell cranks, means on said cranks biasing the overlapping ends of the bell cranks towards said abutting means, a second support member adjustably and removably secured to said standard at various positions thereon, a vertical force rod secured to said second support member and co-axial with said vertical bar, said force rod having means thereon for engaging a spring, means on said second support member to move the force rod relative to said second support member, and means in operative engagement with said force rod to measure the displacement thereof.

WILLIAM J. GOODFRIEND.

REFERENCES CITED

The following references are of record in the file of this patent:

UNITED STATES PATENTS

| Number | Name | Date |
| --- | --- | --- |
| 973,909 | Benson | Oct. 25, 1910 |
| 1,287,645 | Crane | Dec. 17, 1918 |
| 1,683,861 | Cameron | Sept. 11, 1928 |
| 1,908,412 | Domina | May 9, 1933 |
| 1,921,793 | Thelander | Aug. 8, 1933 |
| 2,009,691 | Grist | July 30, 1935 |
| 2,170,197 | Gumprich | Aug. 22, 1939 |
| 2,338,057 | Peterson | Dec. 28, 1943 |